US011946605B2

(12) United States Patent
Shum

(10) Patent No.: US 11,946,605 B2
(45) Date of Patent: *Apr. 2, 2024

(54) POST TOP LED LAMP OPTICS

(71) Applicant: Frank Shum, Sunnyvale, CA (US)

(72) Inventor: Frank Shum, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,221

(22) Filed: Feb. 16, 2023

(65) Prior Publication Data

US 2023/0265978 A1 Aug. 24, 2023

Related U.S. Application Data

(63) Continuation of application No. 17/663,070, filed on May 12, 2022, now Pat. No. 11,614,207.

(Continued)

(51) Int. Cl.

| | |
|---|---|
| ***F21K 9/233*** | (2016.01) |
| ***F21K 9/237*** | (2016.01) |
| ***F21K 9/68*** | (2016.01) |
| ***F21S 8/08*** | (2006.01) |
| ***F21V 19/00*** | (2006.01) |
| *F21Y 115/10* | (2016.01) |

(52) U.S. Cl.

CPC .............. *F21K 9/233* (2016.08); *F21K 9/237* (2016.08); *F21K 9/68* (2016.08); *F21S 8/088* (2013.01); *F21V 19/006* (2013.01); *F21Y 2115/10* (2016.08)

(58) Field of Classification Search

None

See application file for complete search history.

(56) References Cited

U.S. PATENT DOCUMENTS 9,420,644 B1 8/2016 Shum
9,581,323 B2 2/2017 Shum
(Continued)

OTHER PUBLICATIONS

Green Electrical Supply LLC, "Satco S9779 led post top replacement retrofit light bulb 40w 3000k medium e26 base 120-277v—led post top replacement for metal halide or high pressure sodium lights in post top fixtures at Green Electrical Supply," Green Electrical Supply. http://www.greenelectricalsupply.com/40-watt-base-down-post-top-led-retrofit-e26-medium-base-3000k.aspx (accessed May 12, 2022).

(Continued)

*Primary Examiner* — Elmito Breval
(74) *Attorney, Agent, or Firm* — Craige Thompson; Thompson Patent Law; Timothy D. Snowden

(57) ABSTRACT

Apparatus and associated methods relate to an energy efficient and pollution reducing post top lamp. In an illustrative example, a replaceable light unit (RLU) includes a LED package distributed about a first axis of the RLU. The LED package, for example, may emit a light being redirected by a first optical element to generate a first optical distribution along a first optical axis in a first direction, the first optical axis being substantially parallel to the first axis. The first optical distribution may be, for example, reflected by a second optical element such that at least a portion of the light in the first optical distribution may be reflected into a second optical distribution. For example, at least fifty percent of the light in the second optical distribution may be greater than fifty degrees from the first optical axis. Various embodiments may advantageously conserve energy and/or reduce light pollution.

20 Claims, 5 Drawing Sheets

Related U.S. Application Data

(60) Provisional application No. 63/201,782, filed on May 12, 2021.

(56) References Cited

U.S. PATENT DOCUMENTS

| | | | |
|---|---|---|---|
| 9,897,304 B2 | 2/2018 | Shum |
| 10,082,284 B2 | 9/2018 | Shum |
| 10,697,612 B2 | 6/2020 | Shum |
| 11,022,297 B2 | 6/2021 | Shum |
| 2016/0169476 A1 | 6/2016 | Krames et al. |

OTHER PUBLICATIONS

Landscape Communications Inc., "Spectra Lighting Inc Element Series Modern Post Top | Landscape Architect," Landscape Architect. https://landscapearchitect.com/ladetails/landscape-product/area-street-fixtures-luminaires/spectra-lighting-inc/element-series-modern-post-top (accessed May 12, 2022).

LED Uncle, "Luminosity Post Top Lantern/Post Top Lamp/LED Post Top Light for Commercial Areas and Parking Lots 70w, 100w," LED Uncle. https://www.leduncle.com/products/post-top-lantern-post-top-lamp-led-post-top-light-for-commercial-areas-parking-lots (accessed May 12, 2022).

Lighting Supply Outlet, "Round Post Top LED Light-60 Watt," Lighting Supply Outlet. https://www.lightingsupplyoutlet.com/round-post-top-led-light-60-watt/ (accessed May 12, 2022).

Okaybulb, "30 Watt Post Top Retrofit LED Invert Garden Corn Light 5000K Bulb, Large Mogul E39 Base, 360° Street/Garden Lighting Replacement for 100W Metal Halide Bulb, HID, CFL, MH, HID, HPS(UL-Listed)—Amazon.com," Amazon, May 26, 2019. https://www.amazon.com/okaybulb-Retrofit-Lighting-Replacement-UL-Listed/dp/B07PVK46D3 (accessed May 12, 2022).

Seginus Lighting, "Hadco Urban Post Lights," Seginus Lighting. https://www.seginuslighting.com/collections/hadco-post-lights?page=2 (accessed May 12, 2022).

ZLed Lighting, "IP64 and IP65 LED Post Top Corn Lamps," ZLed Lighting. https://zled-lighting.com/products/post-top-corn-lamps-2/ (accessed May 12, 2022).

POST TOP LED LAMP OPTICS

CROSS-REFERENCE TO RELATED APPLICATIONS

This application is a continuation application and claims the benefit of U.S. application Ser. No. 17/663,070, titled "Post Top LED Lamp Optics," filed by Frank Shum, on May 12, 2022, which application claims the benefit of U.S. Provisional Application Ser. No. 63/201,782, titled "Post Top LED Lamp Optics," filed by Frank Shum, et al., on May 12, 2021.

This application incorporates the entire contents of the foregoing application(s) herein by reference.

The subject matter of this application may have common inventorship with and/or may be related to the subject matter of the following:

- U.S. application Ser. No. 14/952,079, titled "LED Lighting," filed by Frank Shum on Nov. 25, 2015, and issued as U.S. Pat. No. 9,420,644 on Aug. 16, 2016;
- U.S. application Ser. No. 15/215,964, titled "LED Lighting," filed by Frank Shum, on Jul. 21, 2016, and issued as U.S. Pat. No. 9,581,323 on Feb. 28, 2017;
- European Application Serial No. EP 17832026.3, titled "LED Lighting," filed by Frank Shum on Jan. 29, 2019;
- U.S. Application Serial No. 2019-503405, titled "LED Lighting," filed by Frank Shum on Jan. 17, 2019;
- U.S. Application Serial No. PCT/US2017/052632, titled "LED Lighting," filed by Frank Shum on Sep. 21, 2017;
- U.S. application Ser. No. 15/407,140, titled "LED Light Re-Direction Accessory," filed by Frank Shum on Jan. 16, 2017, and issued as U.S. Pat. No. 9,897,304 on Feb. 20, 2018;
- U.S. application Ser. No. 15/880,369, titled "LED Light Re-Direction Accessory," filed by Frank Shum on Jan. 25, 2018, and issued as U.S. patent Ser. No. 10/082,284 on Sep. 25, 2018;
- U.S. application Ser. No. 16/130,891, titled "LED LIGHT RE-DIRECTION ACCESSORY," filed by Frank Shum on Sep. 13, 2018;
- U.S. application Ser. No. 16/713,452, titled "LED Light Re-Direction Accessory," filed by Frank Shum on Dec. 13, 2019;
- U.S. application Ser. No. 16/821,791, titled "LED LIGHT RE-DIRECTION ACCESSORY," filed by Frank Shum on Mar. 17, 2020;
- U.S. application Ser. No. 17/302,029, titled "LED LIGHT RE-DIRECTION ACCESSORY," filed by Frank Shum on Apr. 21, 2021; U.S. application Ser. No. 29/663,330, titled "LED Light Re-Direction Accessory," filed by Frank Shum on Sep. 13, 2018;
- U.S. Application Serial No. PCT/US16/34331, titled "LED Lighting," filed by Frank Shum on May 26, 2016;
- U.S. application Ser. No. 17/179,843, titled "Driver Incorporating A Lighting Ballast for Supplying Constant Voltage Loads," filed by Frank Shum on Feb. 19, 2021;
- U.S. Application Ser. No. 62/979,254, titled "Driver Incorporating A Lighting Ballast for Supplying Constant Voltage Loads," filed by Frank Shum, et al., on Feb. 20, 2020;
- U.S. Application Ser. No. 63/084,708, titled "Location of Temperature Sensitive Components in LED Luminaires," filed by Frank Shum on Sep. 29, 2020; and,
- U.S. application Ser. No. 15/968,924, titled "LIGHT DISTRIBUTION FOR PLANAR PHOTONIC COMPONENT," filed by Frank Shum on May 2, 2018 and issued as U.S. patent Ser. No. 10/697,612 on Jun. 30, 2020.

This application incorporates the entire contents of the foregoing application(s) herein by reference.

TECHNICAL FIELD

Various embodiments relate generally to post top lamps.

BACKGROUND

Street lighting is an integral part of modern city landscape. In some examples, street lighting may be a raised source of light. Often, street lighting is mounted on a lamp column or pole either on either or both side of a road. Sometimes, the street lighting may be suspended over a wire above the road to provide illumination. Street lighting is important for road users to see accurately in darkness and improve safety. In some areas, street lighting may provide additional measures to prevent crimes.

Street lighting is, in some examples, using light emitting diode (LED) as light source. The primary advantageous of LED street lighting is energy efficiency compared to conventional street lighting fixture technologies (e.g., high pressure sodium (HPS) and metal halide (MH)). For example, an LED street light may also be more durable, with a more predictable lifetime.

SUMMARY

Apparatus and associated methods relate to an energy efficient and pollution reducing post top lamp. In an illustrative example, a replaceable light unit (RLU) includes a LED package distributed about a first axis of the RLU. The LED package, for example, may emit a light being redirected by a first optical element to generate a first optical distribution along a first optical axis in a first direction, the first optical axis being substantially parallel to the first axis. The first optical distribution may be, for example, reflected by a second optical element such that at least a portion of the light in the first optical distribution may be reflected into a second optical distribution. For example, at least fifty percent of the light in the second optical distribution may be greater than fifty degrees from the first optical axis. Various embodiments may advantageously conserve energy and/or reduce light pollution.

Various embodiments may achieve one or more advantages. For example, some embodiments may permit some light to travel beyond the second optical element to advantageously illuminate a top portion of a lamp top. Some embodiments may, for example, advantageously configured to concentrate at least 50% of the first optical distribution within fifty degrees from the first optical axis. Some embodiments may advantageously configure the second optical distribution to be evenly distributed at a target area.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
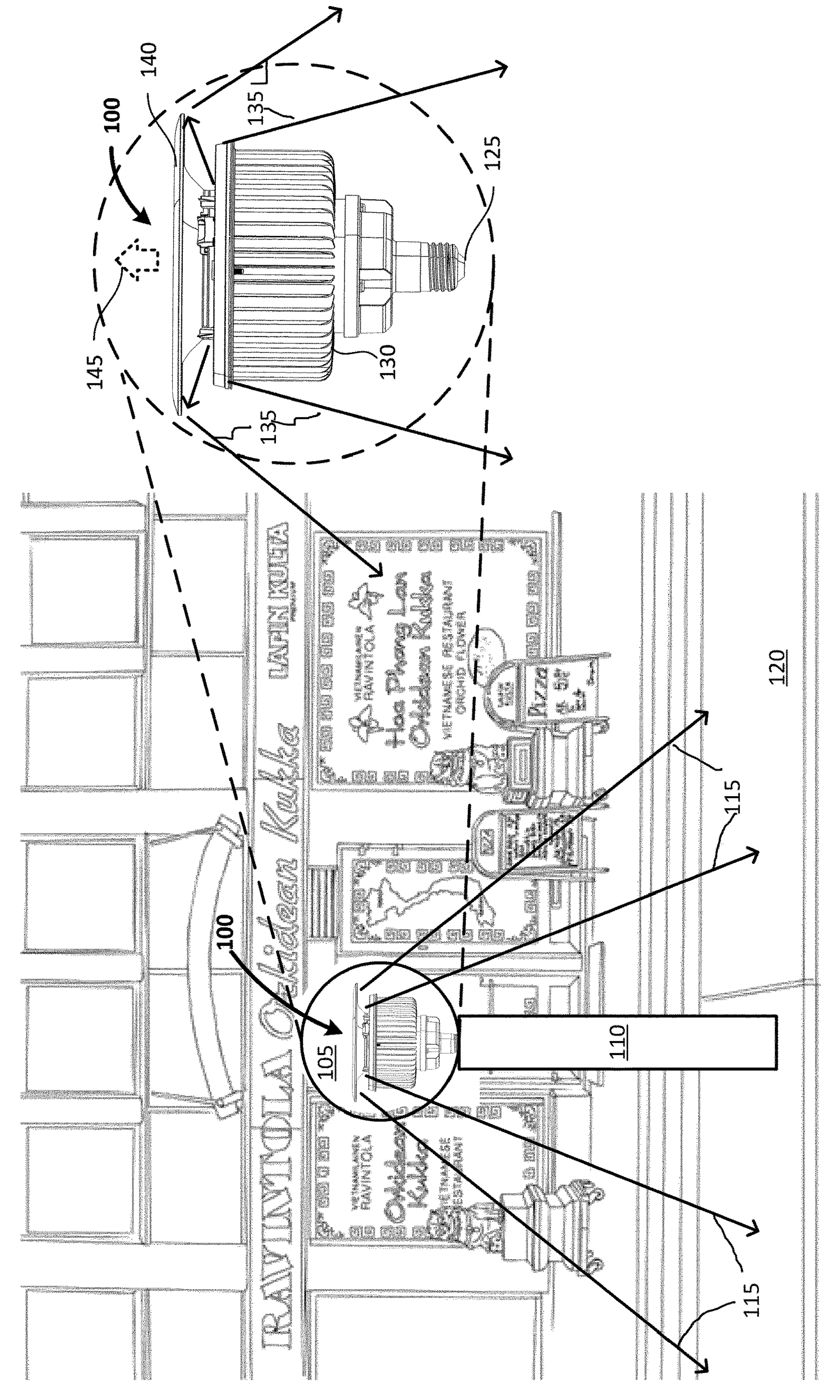
FIG. 1 depicts an exemplary replaceable lighting unit (RLU) employed in an illustrative use-case scenario.

FIG. 1 depicts an exemplary replaceable lighting unit (RLU 100) employed in an illustrative use-case scenario. In this example, the RLU 100 is coupled to a post top 105 above a lamp post 110. For example, the post top 105 may be transparent (e.g., glass top or transparent plastic) such that light can penetrates through. As shown in FIG. 1, the RLU 100 is providing lighting for a street by emitting light rays 115 towards a ground 120. In various examples, arrows representing the light rays 115 are for illustration purpose only. For example, the RLU 100 may emits light rays to the ground 120 that creates a substantially even distribution of light covering an illuminated area of the ground 120. For example, as discussed in later figures, the illuminated area may be substantially circular, rectangular, or in other shapes configured by the RLU 100.

A close-up diagram of the RLU 100 is shown on the right side of FIG. 1. As shown, the RLU 100 includes a socket base 125 and a heat sink 130. For example, the socket base 125 may include threaded elements to couple to the post top 105. For example, the post top 105 may supply electrical power to the RLU 100 via the socket base 125. The heat sink 130 may, for example, be housing a lighting circuit (not shown) of the RLU 100. In some implementations, the lighting circuit may include a power circuit, a controller, and a lighting element. The lighting element may be a light emitting diode (LED) package, for example, mounted the socket base 125 in a downward position having light emitting direction pointed towards the sky.

As shown in this illustrative example, the lighting element is emitting an output light 135 upwards in various angles. For example, when the RLU 100 is installed as shown to the lamp post 110, the output light 135 may be emitting skyward from the lighting element. The RLU 100 includes a reflector 140 above the heat sink 130 and the light emitting element, in this example. The reflector 140 may, for example, include at least partially a reflective surface. In some implementations, the reflector 140 may be configured to reflect a portion of the output light 135 towards the ground 120. In some implementations, the reflector 140 may be configured in a shape to advantageously produce a predetermined light distribution. For example, the reflector 140 may be configured in a shape to produce a predetermined (e.g., uniform) distribution along the ground.

In various implementations, the reflector 140 may include one or more reflective lens. For example, the reflective lens may be configured to distribute received light in a specific predetermined distribution. In some examples, the reflective lens may be configured to leak a portion of the received light through the reflector 140. In some implementations, the reflector 140 may be configured to release less than 20% of the total light energy through (e.g., skyward in this example).

As shown, an upward light 145 is released upward through the reflector 140 so that a top portion of the post top 105 may be illuminated. For example, the upward light 145 may advantageously create a light bulb visual at the post top. In various implementations, an intensity of the upward light 145 may be controlled by the reflector 140. Accordingly, the RLU 100 may advantageously reduce air pollution by controlling the upward light 145. In some implementations, the RLU 100 may advantageously conserve energy by distributing light energy in one direction (e.g., towards the ground 120 of the street).

Figure 2:
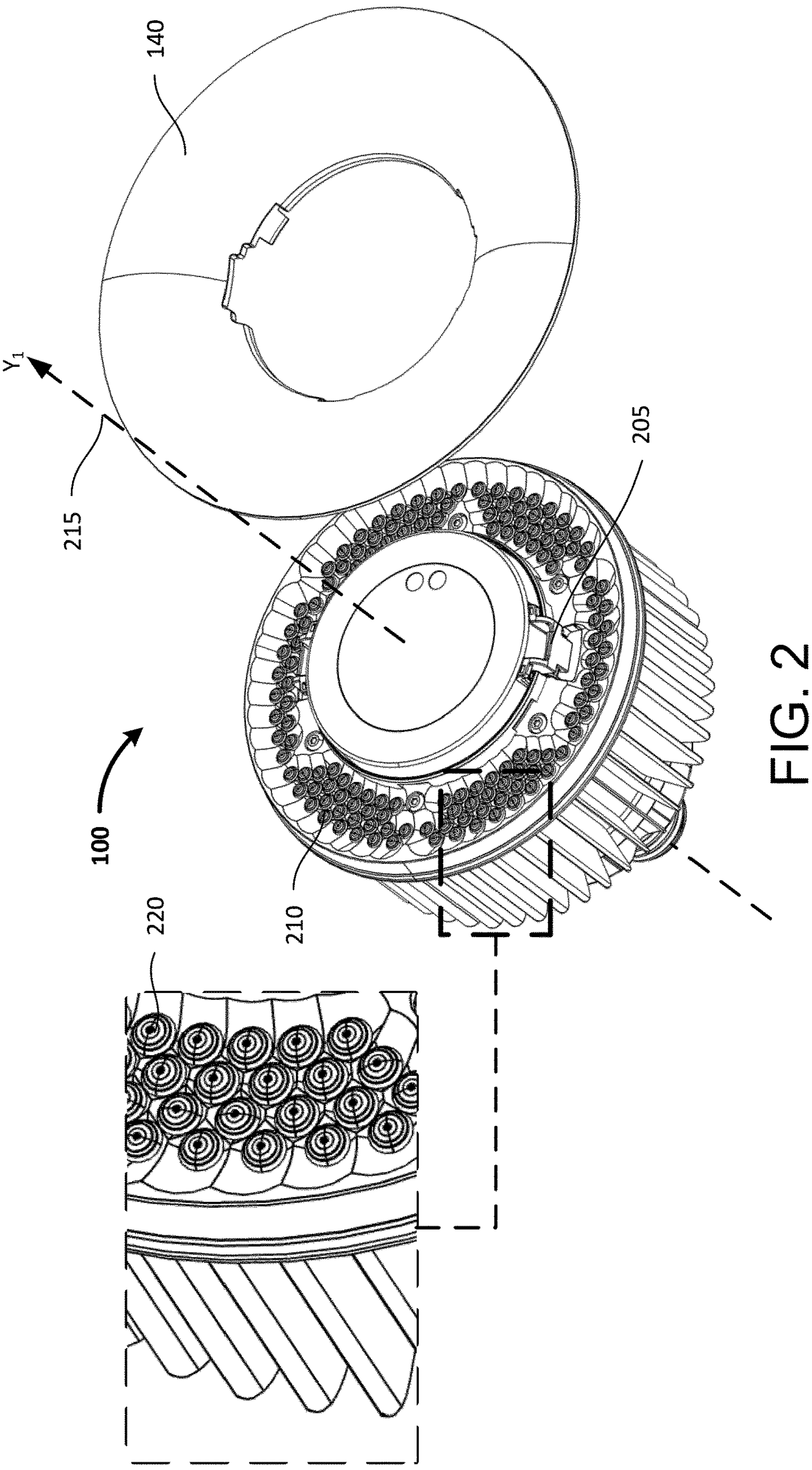
FIG. 2 depicts a perspective view of an exemplary RLU having a reflector removed from a main body.

FIG. 2 depicts a perspective view of an exemplary RLU 100 having a reflector 140 removed from a main body. As shown, the RLU 100 includes coupling elements 205 to releasably couple the reflector 140. For example, some embodiments may include the coupling elements 205 as disclosed at least with reference to FIGS. 12A-12B in U.S. application Ser. No. 16/821,791, titled "LED LIGHT REDIRECTION ACCESSORY," filed by Frank Shum on Mar. 17, 2020, the entire contents of which are incorporated herein by reference.

In the depicted example, the RLU 100 includes a lighting package 210. For example, the lighting package 210 may include the light element. For example, in operation, the output light 135, as described with reference to FIG. 1, may pass through the lighting package 210.

In a close-up diagram shown on the left of the FIG. 2, the lighting package 210 includes multiple reflective lens 220. For example, the reflective lens 220 may be disposed in a planar surface over the lighting element such that the planar surface is substantially orthogonal to a light emitting axis 215 of a light emitted from the lighting element beneath. In some implementations, the lighting package 210 may include means for emitting light (e.g., the output light 135) along the light emitting axis 215 axis in a direction of the emitting light.

In some implementations, the output light 135 may be reflected in predetermined angles based on the configuration of the reflective lens 220. In various implementations, the lighting package 210 may be configured to concentrate a larger portion of the light around a central axis. For example, the lighting package 210 may emit a first optical distribution having at least half portion (e.g., 70%) of light emitted from the RLU 100 to be distributed within a predetermined angle (e.g., ±50°) of the light emitting axis 215. For example, some embodiments may include system and methods for achieving the first optical distribution as disclosed at least with reference to FIGS. 4 and 14 in U.S. Pat. No. 10,697,612, filed by Frank Shum on May 2, 2018, the entire contents of which are incorporated herein by reference.

Figure 3:
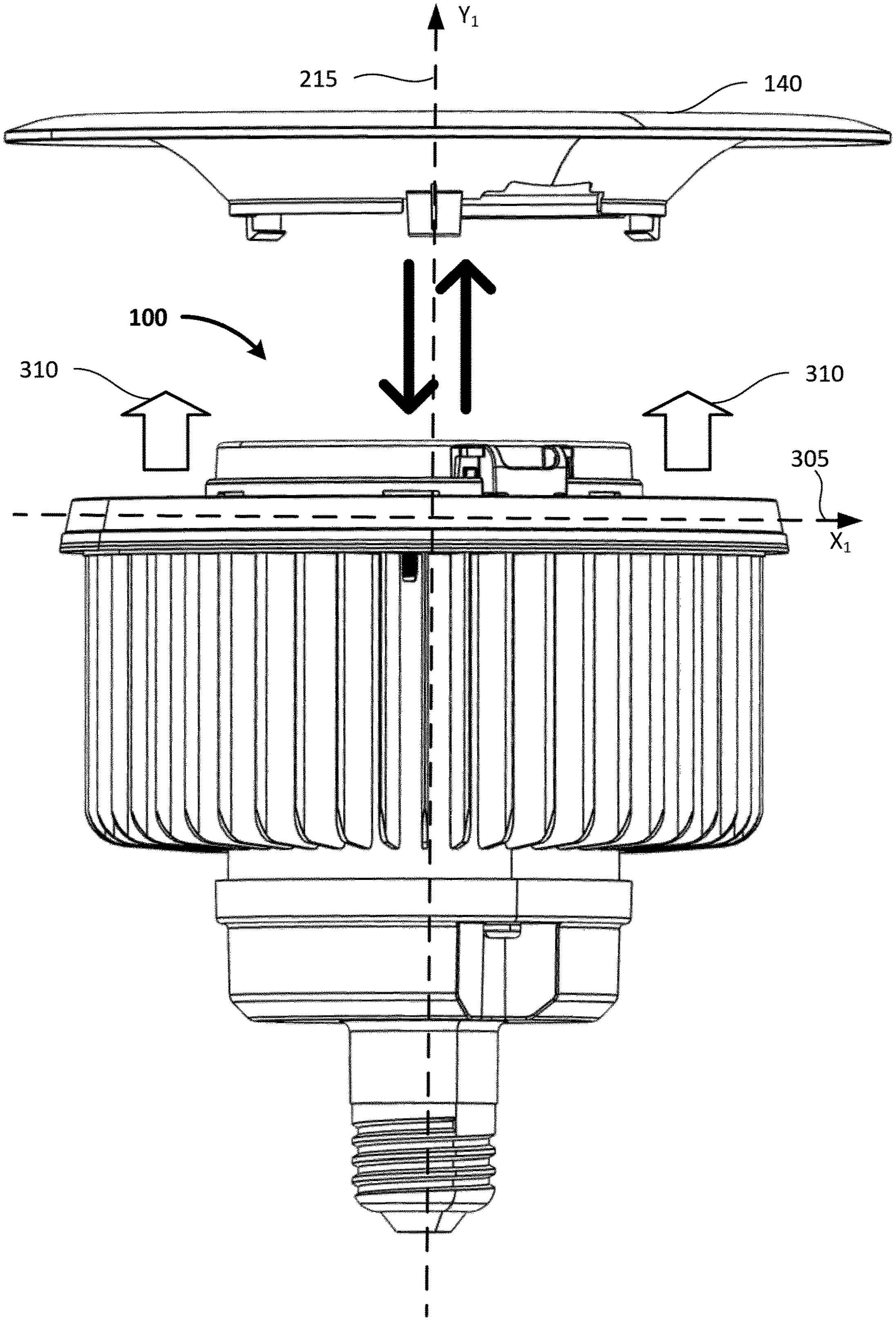
FIG. 3 shows an elevation view of an exemplary RLU with the reflector.

FIG. 3 shows an elevation view of an exemplary RLU 100 with the reflector 140. For example, the reflector 140 may be releasably coupled to the RLU 100 via the coupling elements 205 as described with reference to FIG. 2. As shown, the RLU 100 includes the lighting package 210 on a planar surface 305. In this illustrative example, the planar surface 305 is substantially perpendicular to the light emitting axis 215.

The lighting package 210 emits, in this example, a first optical distribution 310. In this example, the first optical distribution 310 has an upward traveling direction along the light emitting axis 215. For example, the first optical distribution 310 may be controlled by the reflective lens 220 of the lighting package 210. For example, the reflective lens 220 may be configured that the first optical distribution 310 may include 70% of the output light 135 within ±50° of the light emitting axis 215.

Figure 4:
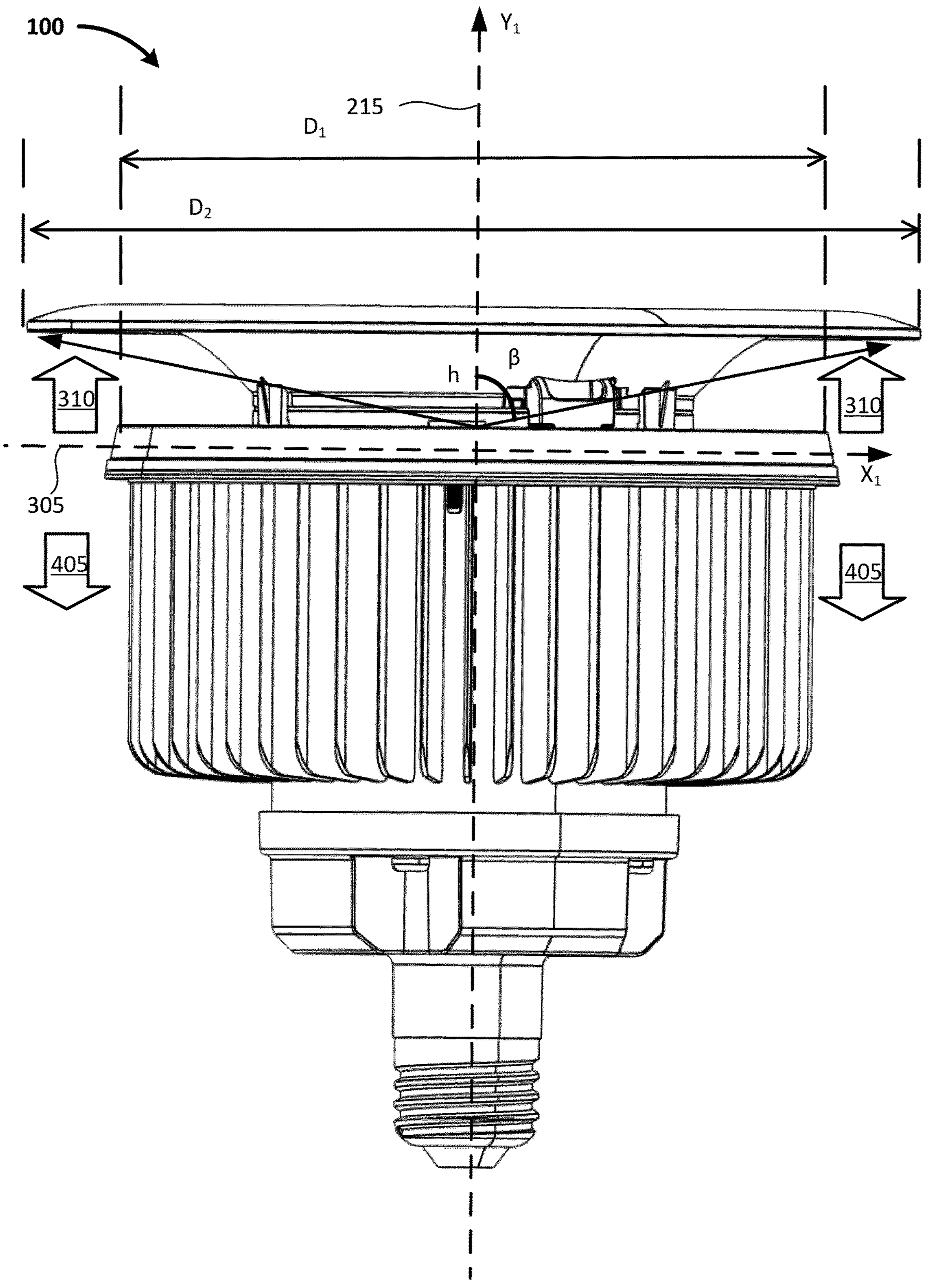
FIG. 4 depicts an exemplary RLU having exemplary optical distributions.

FIG. 4 depicts an exemplary RLU 100 having exemplary optical distributions. In this example, the RLU 100 includes the lighting package 210 emitting a first optical distribution 310 along the light emitting axis 215 in the upward direction. For example, the first optical distribution may have more than 70% of the light emitted from the RLU 100 to be distributed within ±50° of the light emitting axis 215.

The reflector 140, in this example, redirects the first optical distribution 310 into a second optical distribution 405. In various implementations, the lighting package 210 and the reflector 140 may be circular in shape. As shown, the lighting package 210 has a diameter D1 and the reflector 140 has a diameter D2. In some implementations, D2 may be configured based on a width of the first optical distribution 310. For example, D2 may be longer when a width of the first optical distribution 310 is wider.

In some implementations, the reflector 140 may be curved. For example, the second optical distribution 405 may be generated based on a curvature of the reflector 140. In various implementations, the RLU 100 may advantageously be configured to generate a desired second optical distribution by configuring a shape and curvature of the reflector 140.

As an illustrative example, the first optical distribution 310 of the lighting package 210 may be defined as having a predetermined portion (e.g., 50%, 70%, 85%) of the output light 135 within a predetermined angle (as shown as β in FIG. 4) from the light emitting axis 215. At a fixed height h, the diameter of the reflector 140 may be given by the equation:

$$\tan(\beta)=D2/h$$

In some implementations, the angle β may depend, for example, on the diameter D1 of the lighting package. For example, to keep the predetermined portion, β may be increased when D1 increases. Accordingly, the diameter D2 is directly related to the diameter D1. In some implementations, the predetermined angle β may be less than 63°. In various implementations, the diameter D1 may be kept, for example, at a minimum to reduce the size of the reflector 140.

In some implementations, the reflector 140 may be configured such that at least a portion of the output light 135 may be distributed outside of the predetermined angle β. For example, at least 50% of the second optical distribution 405 may be distributed outside of the of the ±50° around the light emitting axis 215.

In some implementations, the second optical distribution 405 may include at least a portion to be concentric to the light emitting axis 215 in a substantially opposite direction to the output light 135 along the light emitting axis 215. For example, at least 50% of the light in the second optical distribution 405 may be centered in an opposite traveling direction of the first optical distribution 310.

Figure 5:
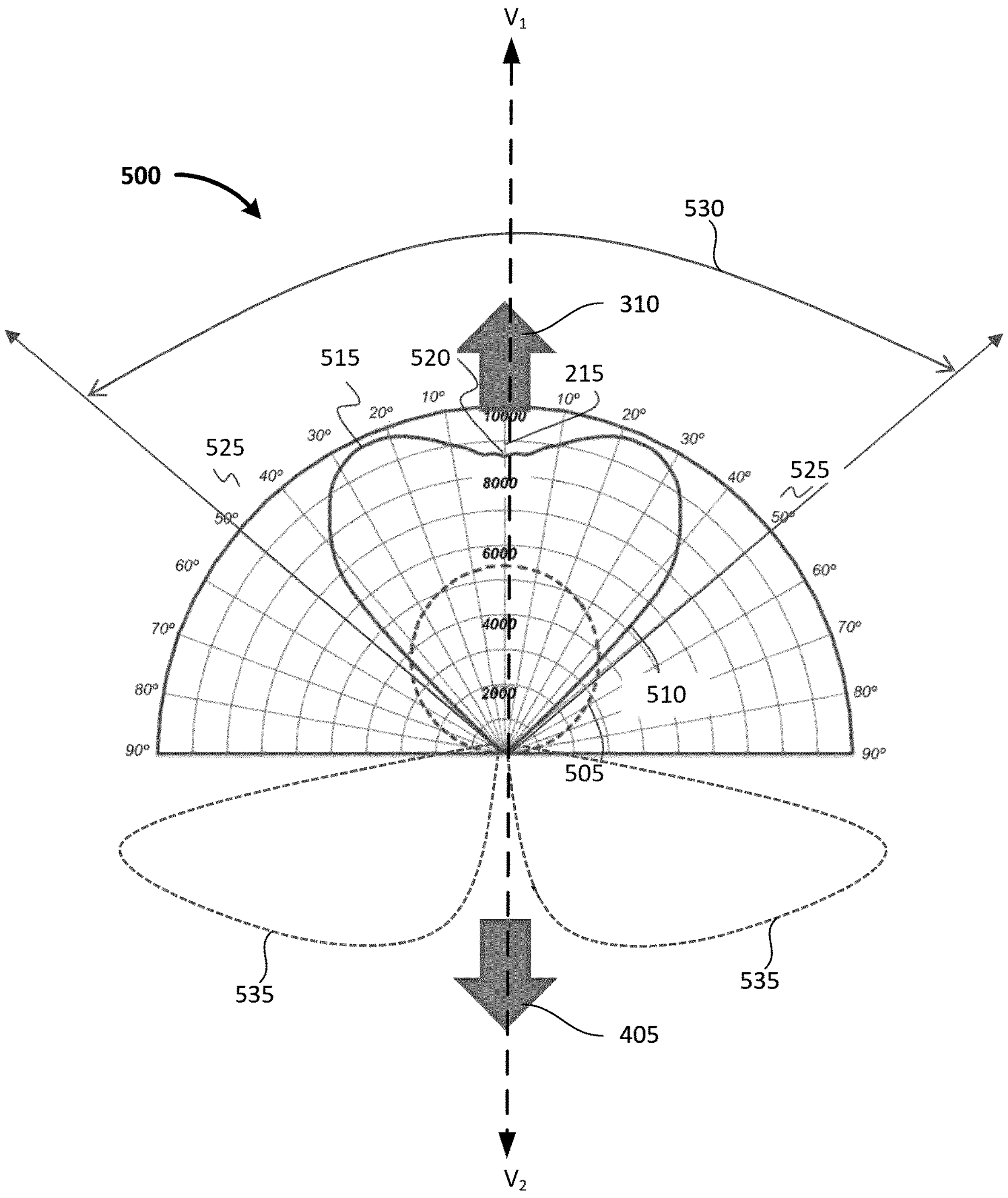
FIG. 5 shows an exemplary optic distribution profile of a first optical distribution and a second optical distribution of an exemplary RLU.

FIG. 5 shows an exemplary optic distribution profile 500 of the first optical distribution 310 and a second optical distribution 405 of an exemplary RLU 100. As shown, the first optical distribution 310 travels substantially along the light emitting axis 215 in a direction $V_1$, and the second optical distribution 405 travels substantially along the light emitting axis 215 in a direction $V_2$. $V_1$ and $V_2$ are, in this example, directly opposite to each other. In this example, a Lambertian distribution 505 shows an exemplary native emission distribution of the lighting element in the lighting package 210. Using the reflective lens 220, the lighting package 210 may, in some implementations, transmit an improved optical distribution 510. For example, the first optical distribution 310 as described with reference to FIGS. 3-4 may have distribution characteristics of the improved optical distribution 510.

The optical distribution 510 includes peaks 515 at least 15 degrees away from the light emitting axis 215. For example, the optical distribution 510 may have a center optical intensity 520. As shown, the first optical distribution 310 may include predetermined angles 525. For example, beyond the predetermined angle 525, the optical intensity may be less than 10%, 5%, or 2% of the center optical intensity 520. In some implementations, as shown by an envelope 530, the first optical distribution 310 may be configured that <30% of the optical output is distributed beyond ±50° around the light emitting axis 215 along the direction $V_1$.

The reflector 140 redirects the first optical distribution 310 into the second optical distribution 405. As shown, the second optical distribution 405 has intensity distribution depicted as envelope 535. For example, the envelope 535 may show that the intensity of the second optical distribution 405 may be substantially uniform beyond a small angle from a 90-degree plane (e.g., a plane parallel to the planar surface 305). In some implementations, at least 50% of light in the second optical distribution 405 is greater than ±50° from the light emitting axis 215 in the direction $V_2$.

Additionally, as shown, a dominant portion (at least 50%) of the second optical distribution 405 is centered at the light emitting axis 215 substantially in the $V_2$ direction. Accordingly, the RLU 100 may advantageously efficiently redirect light energy to a desired direction. In some implementations, the second optical distribution 405 may include a sharp-cut off angle (e.g., ±50°) along the direction $V_2$ of the light emitting axis 215 such that no light is reflected past a predetermined angle.

Although various embodiments have been described with reference to the figures, other embodiments are possible. In some implementations, multiple RLU 100 may be combined to generate a desired optical distribution. For example, multiple second optical distributions may overlap with other lights to produce an overall distribution.

Although an exemplary system has been described with reference to FIG. 1, other implementations may be deployed in other industrial, scientific, medical, commercial, and/or residential applications.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A replaceable post top light-emitting device comprising:

at least one lighting element disposed about a first axis;

a first optical element redirecting light emitted by the at least one lighting element in a first optical distribution along a first optical axis in a first direction, the first optical axis being substantially parallel to the first axis; and, a second optical element configured to reflect at least a portion of the light in the first optical distribution into a second optical distribution such that at least a portion of the light in the second optical distribution is greater than 50° from the first optical axis.

2. The replaceable post top light-emitting device of claim 1, wherein the at least one lighting element is disposed about the first axis on a planar surface substantially orthogonal to the first axis.

3. The replaceable post top light-emitting device of claim 1, further comprising a coupling module such that the second optical element is releasably coupled to the coupling module.

4. The replaceable post top light-emitting device of claim 1, wherein the second optical element is fixedly coupled to the first optical element along a second axis parallel to the first axis.

5. The replaceable post top light-emitting device of claim 4, wherein the second optical distribution comprises a sharp-cut off angle along the second axis such that no light is reflected past the sharp-cut off angle.

6. The replaceable post top light-emitting device of claim 1, wherein the first optical distribution comprises at least 50% of the light emitted by the at least one lighting element within a ±45° around the first optical axis in the first direction.

7. The replaceable post top light-emitting device of claim 1, wherein the second optical distribution comprises at least 50% of the light directed in a second direction opposite to the first direction.

8. The replaceable post top light-emitting device of claim 1, wherein a predetermined pass-through portion of the light emitted by the at least one light element is transmitted beyond the second optical element.

9. The replaceable post top light-emitting device of claim 8, wherein the predetermined pass-through portion is less than 20%.

10. The replaceable post top light-emitting device of claim 1, wherein the first optical element comprises at least one reflective lens.

11. The replaceable post top light-emitting device of claim 1, wherein the second optical element comprises at least one reflective lens.

12. The replaceable post top light-emitting device of claim 11, wherein the at least one reflective lens is configured to produce a predetermined distribution of light.

13. The replaceable post top light-emitting device of claim 1, wherein the replaceable post top light-emitting device comprises a replaceable post top LED lamp.

14. The replaceable post top light-emitting device of claim 1, wherein the replaceable post top light-emitting device comprises a socket base extending along the first axis.

15. The replaceable post top light-emitting device of claim 14, wherein the at least one lighting element is configured to be releasably coupled to a power source via the socket base.

16. The replaceable post top light-emitting device of claim 1, wherein the at least one lighting element comprises a plurality of LED elements.

17. The replaceable post top light-emitting device of claim 1, wherein at least 50% of the light in the second optical distribution is greater than 50° from the first optical axis.

18. The replaceable post top light-emitting device of claim 1, wherein the first optical distribution comprises a center optical intensity and a predetermined angle, such that an optical intensity beyond the predetermined angle is a fixed portion of the center optical intensity.

19. The replaceable post top light-emitting device of claim 1, wherein the second optical distribution comprises a uniform intensity beyond a small deviation angle from a planar surface perpendicular to the first optical axis.

20. The replaceable post top light-emitting device of claim 1, wherein the first optical axis is in an upward direction.

* * * * *